United States Patent [19]
DiRisio et al.

[11] Patent Number: 5,974,266
[45] Date of Patent: Oct. 26, 1999

[54] ONE-TIME-USE CAMERA WITH FILM WINDING THUMBWHEEL REMOVABLE TO UNLOAD EXPOSED FILM ROLL

[75] Inventors: Anthony DiRisio, Rochester; Jeffrey A. Solomon, Spencerport, both of N.Y.

[73] Assignee: Eastman Kodak Company, Rochester, N.Y.

[21] Appl. No.: 09/128,800

[22] Filed: Aug. 4, 1998

[51] Int. Cl.⁶ .................................................. G03B 17/02
[52] U.S. Cl. ................................................ 396/6; 396/538
[58] Field of Search ........................... 396/6, 411, 535, 396/536, 537, 538, 541

[56] References Cited

U.S. PATENT DOCUMENTS

| | | |
|---|---|---|
| Re. 26,181 | 4/1967 | Harvey et al. . |
| 2,762,280 | 9/1956 | Menar et al. . |
| 3,603,232 | 9/1971 | Jones . |
| 4,647,170 | 3/1987 | Stoneham . |

*Primary Examiner*—Howard B. Blankenship
*Attorney, Agent, or Firm*—Roger A. Fields

[57] ABSTRACT

A camera comprising a main body part having a chamber for holding an exposed filmstrip wound into a exposed film roll, and a film winding thumbwheel for winding the exposed filmstrip into the exposed film roll, is characterized in that the main body part has a film egress opening at one end of the chamber which is dimensioned to allow the exposed film roll to be unloaded from the chamber through the film egress opening, and the film winding thumbwheel light-tightly seals the chamber at the film egress opening and is removable to permit the exposed film roll to be unloaded from the chamber.

7 Claims, 7 Drawing Sheets

ONE-TIME-USE CAMERA WITH FILM WINDING THUMBWHEEL REMOVABLE TO UNLOAD EXPOSED FILM ROLL

FIELD OF THE INVENTION

The invention relates generally to the field of photography, and in particular to one-time-use cameras. More specifically, the invention relates to a one-time-use camera with a film winding thumbwheel that is removable to unload an exposed film roll from the camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, an unexposed film roll in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable exposure or frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer rotates the manual thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the exposure counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

SUMMARY OF THE INVENTION

A camera comprising a main body part having a chamber for holding an exposed filmstrip wound into a exposed film roll, and a film winding thumbwheel for winding the exposed filmstrip into the exposed film roll, is characterized in that:

the main body part has a film egress opening at one end of the chamber which is dimensioned to allow the exposed film roll to be unloaded from the chamber through the film egress opening; and the film winding thumbwheel light-tightly seals the chamber over the film egress opening and is removable to permit the exposed film roll to be unloaded from the chamber.

DETAILED DESCRIPTION OF THE INVENTION

Figure 1:
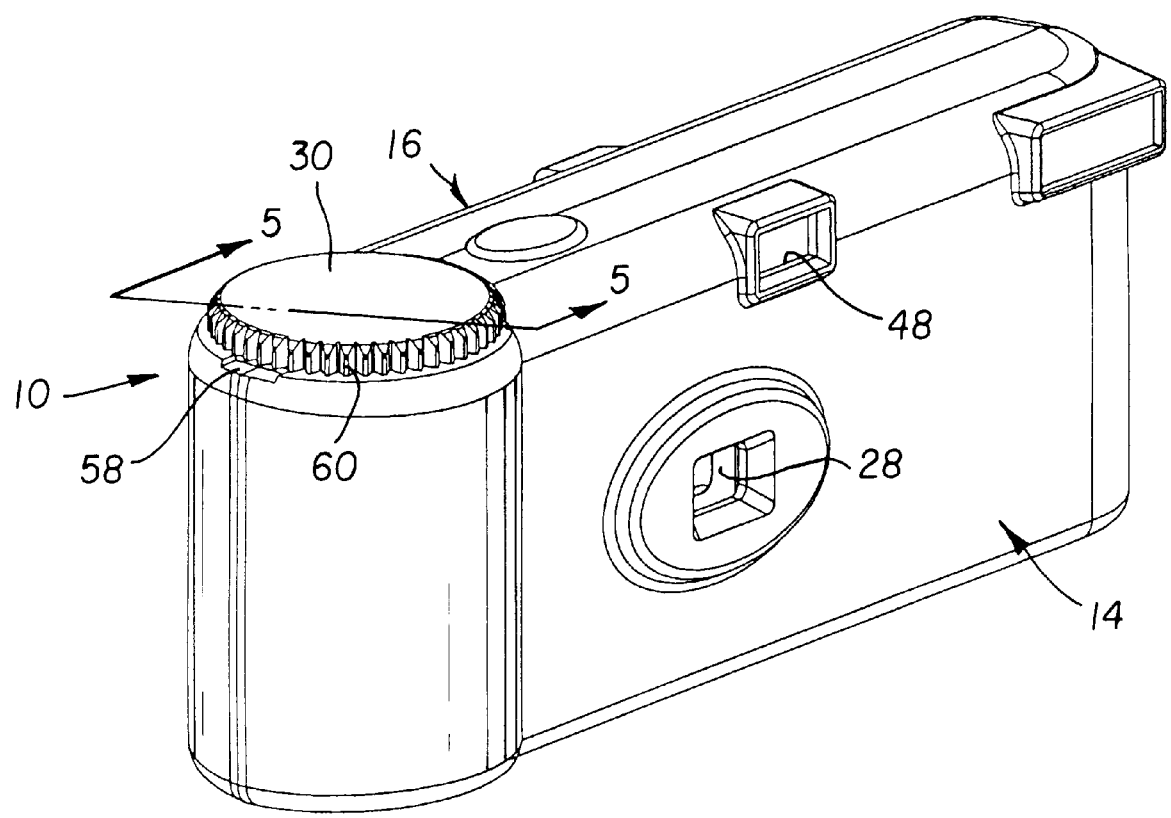
FIG. 1 is a front perspective view of a one-time-use camera according to a preferred embodiment of the invention.

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–5 show a compact one-time-use camera 10 including an opaque main body part 12 and a pair of opaque front and rear cover parts 14 and 16 which house the main body part between them.

Figure 2:
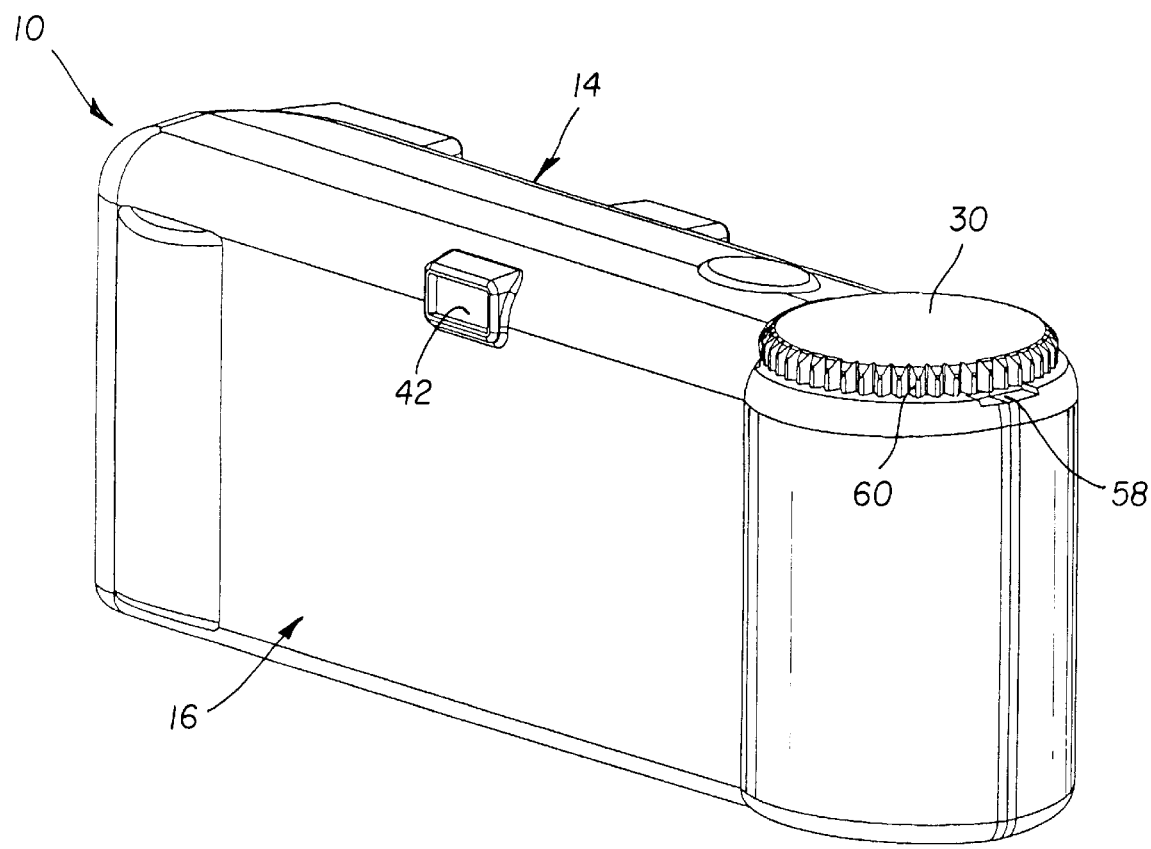
FIG. 2 is a rear perspective view of the one-time-use camera.
Figure 3:
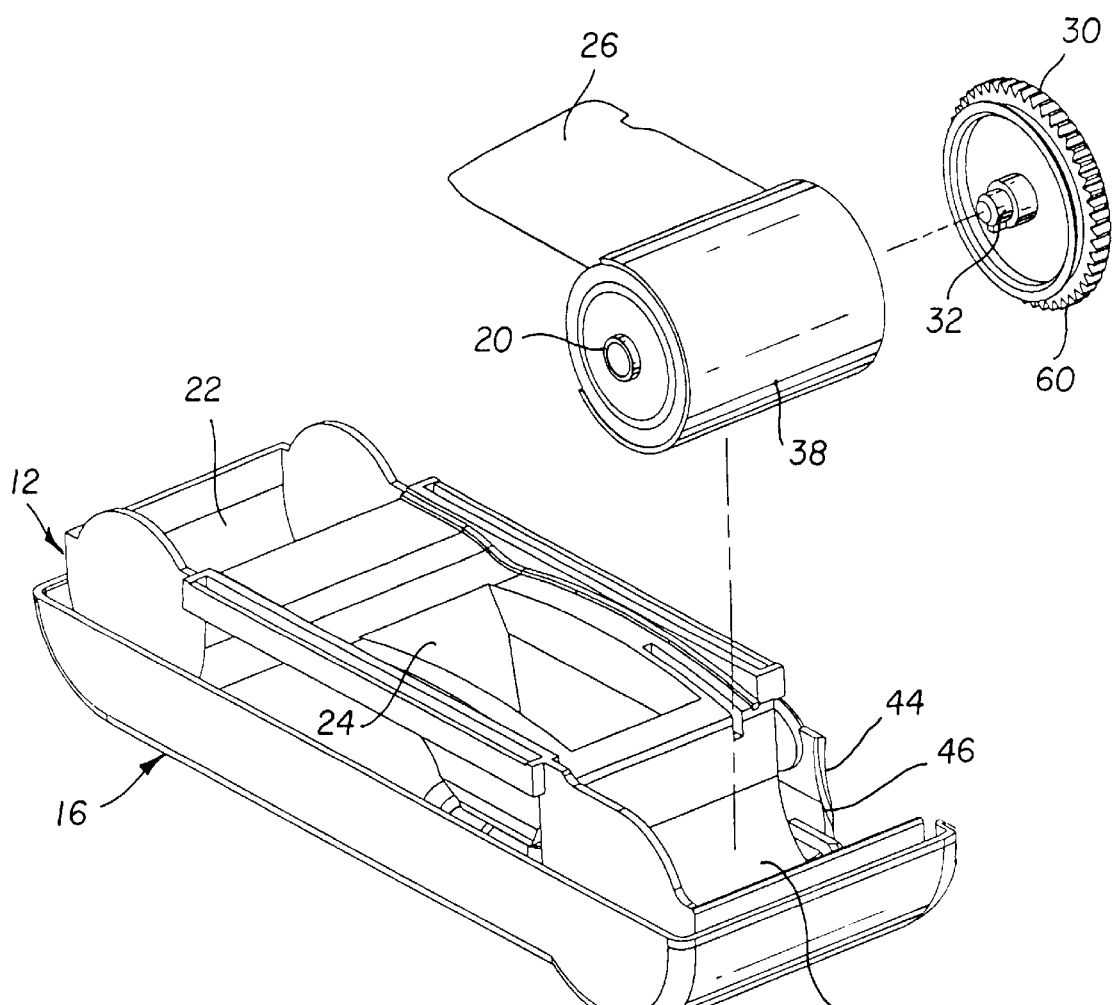
FIG. 3 is an exploded rear perspective view of the one-time-use camera.
Figure 4:
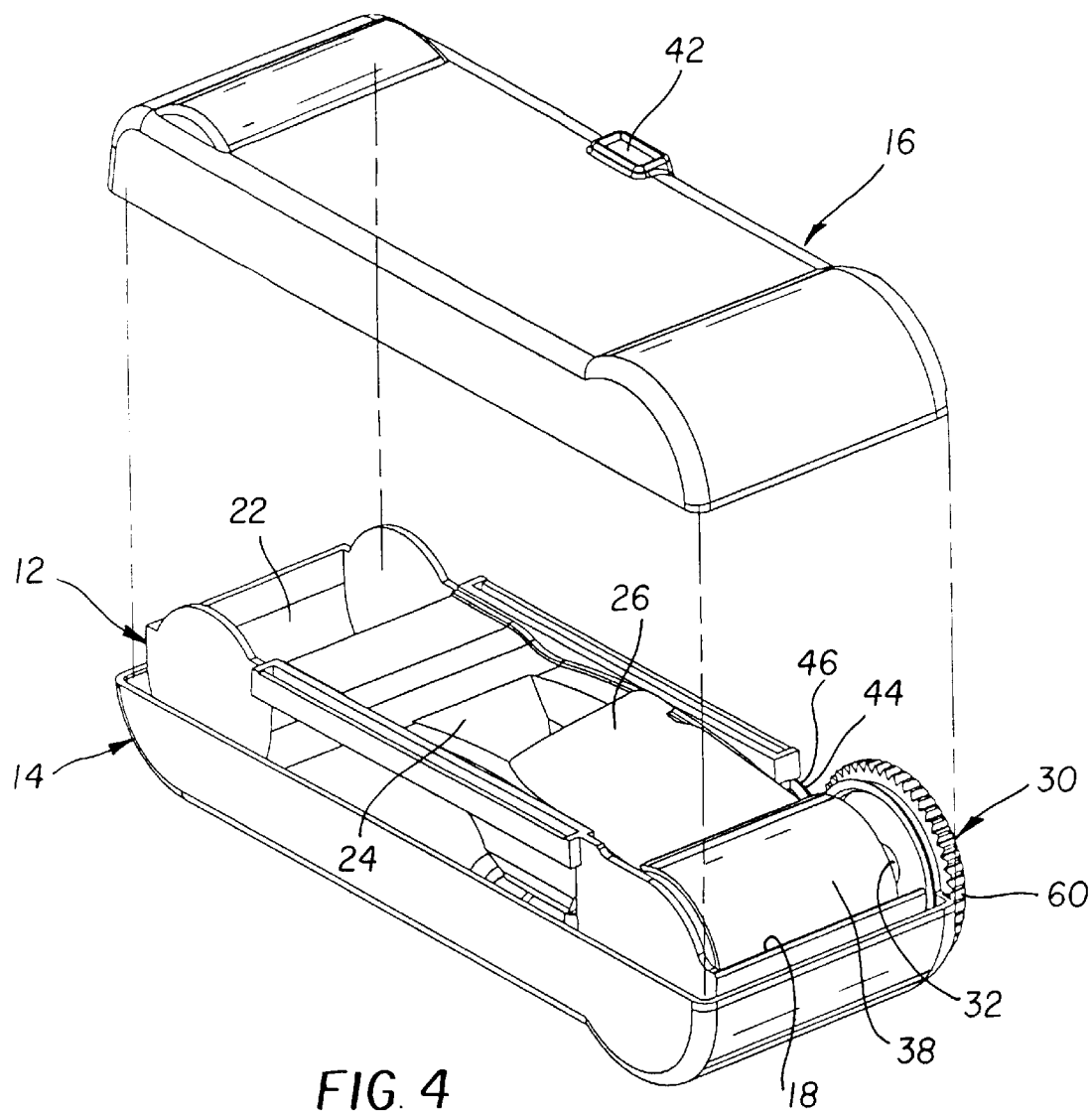
FIG. 4 is a partially assembled rear perspective view of the one-time-use camera.
Figure 5:
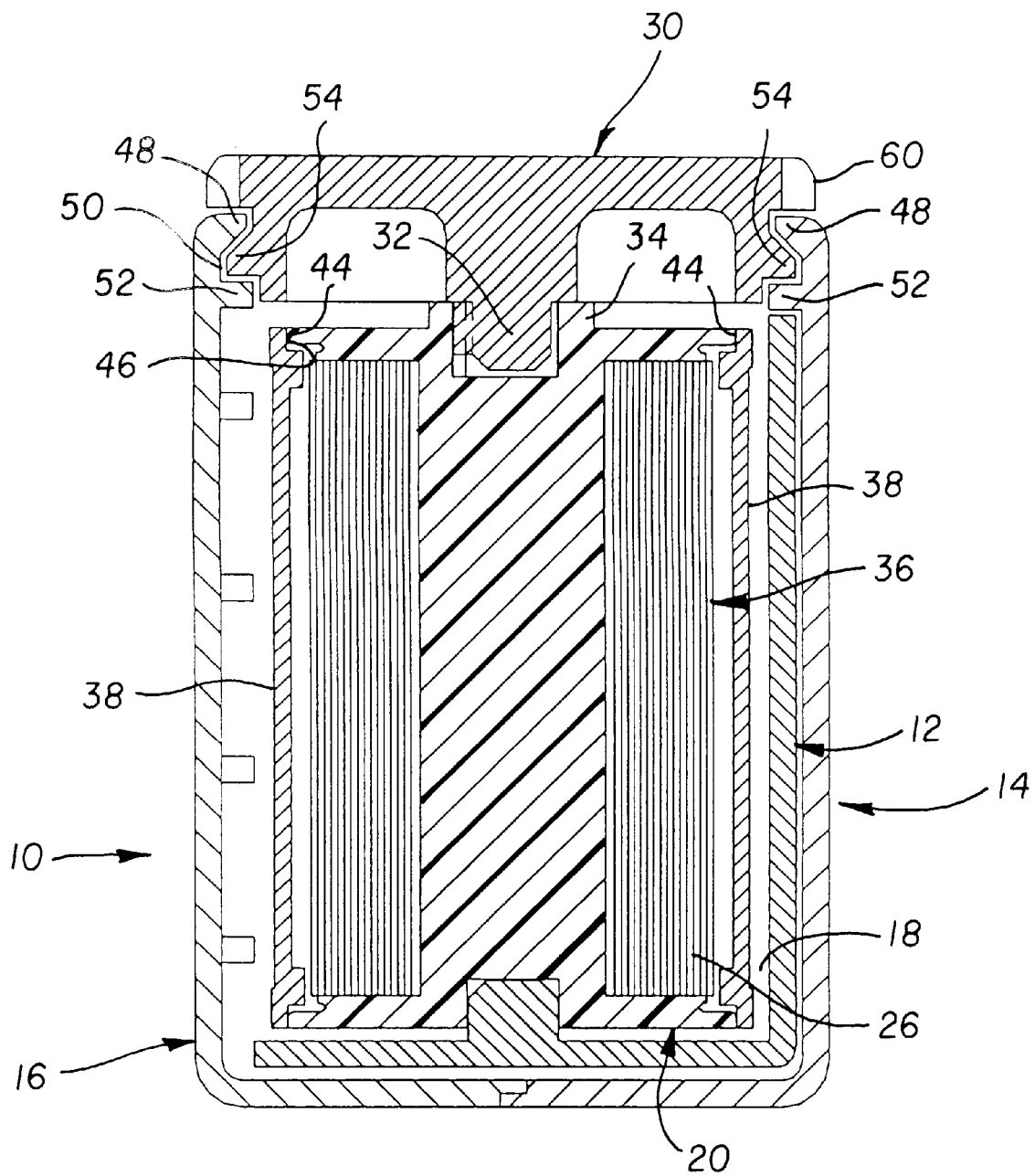
FIG. 5 is a cross-section view of the one-time-use camera as seen in the direction of the arrowed line 5—5 in FIG. 1.

The main body part 12 has a rearwardly open film take-up or exposed film chamber 18 for a known flanged film spool 20 and a rearwardly open film supply chamber 22 for an unexposed film roll (not shown). A backframe opening 24 is located between the exposed film and film supply chambers 18 and 22 for exposing successive image areas of a filmstrip 26 initially stored on the unexposed film roll in the film supply chamber. The backframe opening 24 is optically aligned with a front lens opening 28 in the front cover part 14. A film winding thumbwheel 30 has a depending coaxial stem 32 in coaxial engagement with one end 34 of the film spool 20 in the exposed film chamber 18. Manual winding rotation of the film winding thumbwheel 30 (counter-clockwise in FIG. 1 and clockwise in FIG. 4) similarly rotates the film spool 20 to wind each exposed image area of the filmstrip 26 onto the film spool to form an exposed film roll 36. The exposed film roll 36 is contained in a resilient c-shaped 38 which is held stationary when the film spool 20 is rotated As shown in FIGS. 1 and 2, the front and rear cover parts 14 and 16 have respective front and rear optically aligned viewfinder openings 40 and 42 for viewing a subject to be photographed.

A film egress opening 44 at one end 46 of the exposed film chamber 18 is dimensioned to allow the film spool 20 with the exposed film roll 36 contained in the c-shaped clip 38 to be unloaded from the exposed film chamber 18. See FIGS. 5 and 7.

The front and rear cover parts 14 and 16 together have a parallel pair of annular beads 48 and 50 separated by an annular recess 52 and the film winding thumbwheel 30 has a single annular bead 54 that is located in the annular recess 52 for the front and rear cover parts to rotatably support the film winding thumbwheel and to provide a light-trapping labyrinth proximate the film egress opening 44 in order to light-tightly seal the film egress opening. The annular bead 48 and/or the annular bead 54 is compliant and resilient.

Figure 6:
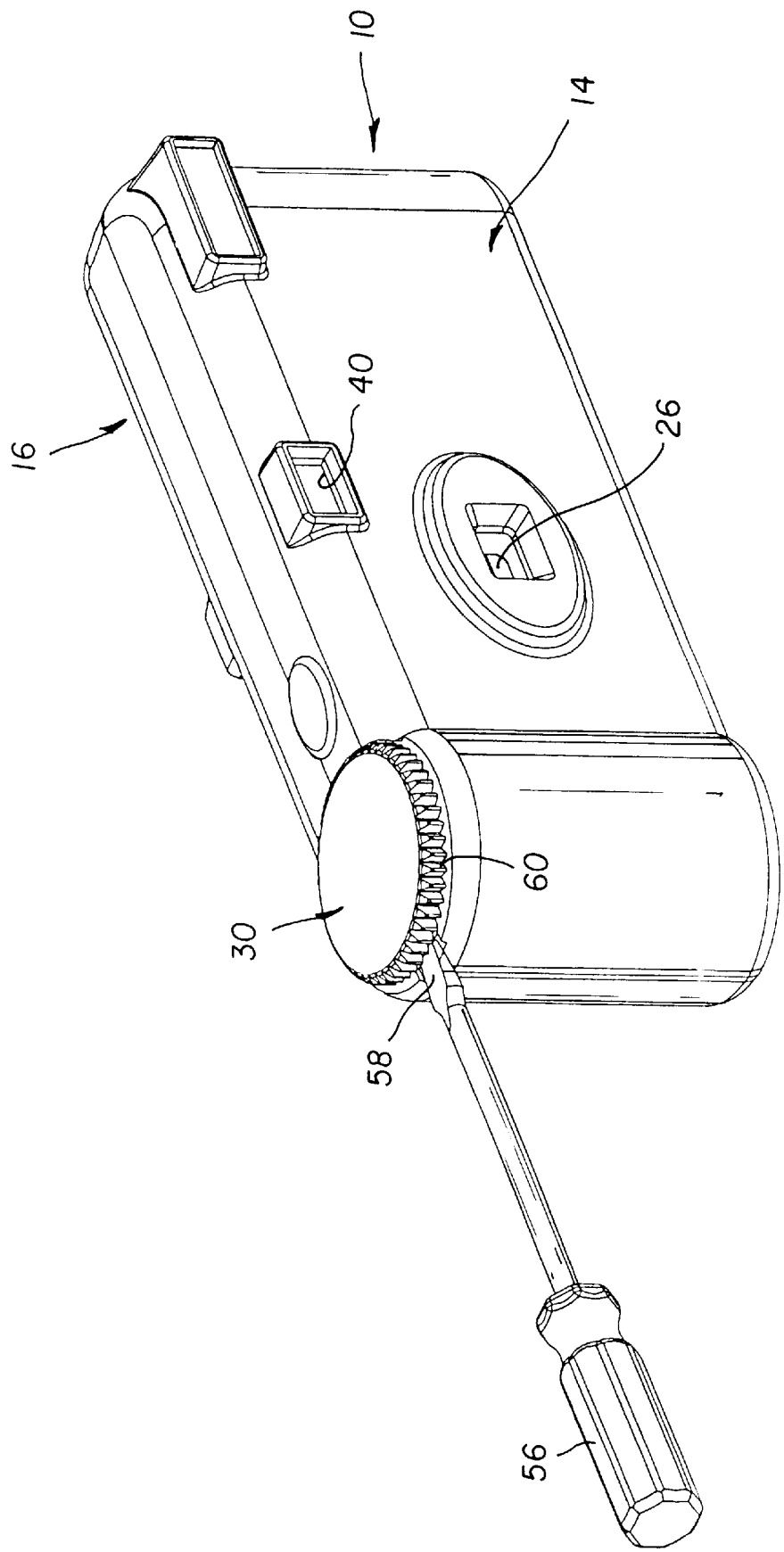
FIGS. 6 and 7 are front perspective views of the one-time-camera, illustrating a method of unloading an exposed film roll from the camera.
Figure 7:
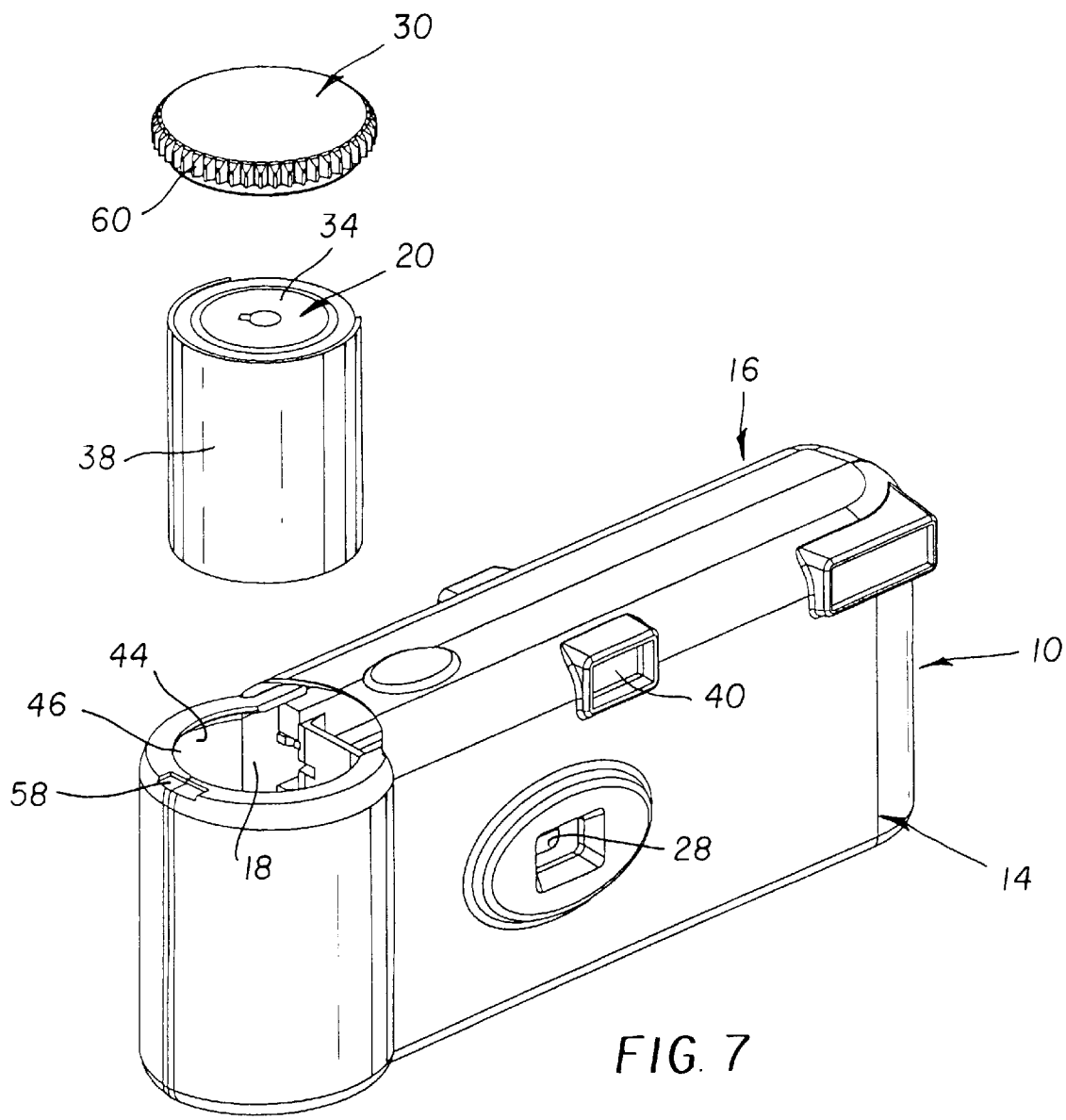

A method of unloading the film spool 20 with the exposed film roll 36 contained in the c-shaped clip 38 from the exposed film chamber 18 is shown in FIGS. 6 and 7. A screwdriver 56 or other suitable tool is inserted into an access recess 58 in the front and rear cover parts 14 and 16, beneath a rigid toothed peripheral edge 60 of the film winding thumbwheel 30, to pry the annular bead 54 out of the annular recess 52. This removes the film winding thumbwheel 30 from over the film egress opening 44. Then, the film spool 20 with the exposed film roll 36 contained in the c-shaped clip 38 is unloaded from the exposed film chamber 18

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. rear cover part
18. exposed film chamber
20. film spool
22. film supply chamber
24. backframe opening
26. filmstrip
28. front lens opening
30. film winding thumbwheel
32. thumbwheel coaxial stem
34. spoolend
36. exposed film roll
38. c-shaped clip
40. front viewfinder opening
42. rear viewfinder opening
44. film egress opening
46. chamber end
48. annular bead
50. annular bead
52. annular recess
54. annular bead
56. screwdriver
58. access recess
60. toothed peripheral edge

What is claimed is:

1. A camera comprising a main body part having a chamber for holding an exposed filmstrip wound into a exposed film roll, and a film winding thumbwheel for winding the exposed filmstrip into the exposed film roll, is characterized in that:

said main body part has a film egress opening at one end of said chamber which is dimensioned to allow the exposed film roll to be unloaded from the chamber through said film egress opening; and said film winding thumbwheel light-tightly seals said chamber at said film egress opening and is removable to permit the exposed film roll to be unloaded from the chamber.

2. A camera as recited in claim 1, wherein a pair of front and rear cover parts that house said main body part between them and said film winding thumbwheel have mutually engaging portions for said front and rear cover parts to rotatably support the thumbwheel and for the front and rear cover parts and the thumbwheel to provide a light-trapping labyrinth proximate said film egress opening.

3. A camera as recited in claim 2, wherein at least one of said engaging portions of said front and rear cover parts and said film winding thumbwheel is compliant to allow the thumbwheel to be separated from the front and rear cover parts in order to be removed from said film egress opening.

4. A camera as recited in claim 2, wherein said engaging portions of said front and rear cover parts and said film winding thumbwheel include an annular bead and a mating annular recess.

5. A method of unloading an exposed film roll from a camera, comprising the steps of:

removing a film winding thumbwheel from over a film egress opening at one end of a chamber that holds an exposed film roll; and unloading the exposed film roll from the chamber through the film egress opening.

6. A method as recited in claim 5, wherein the thumbwheel is removed from over the film egress opening by prying a peripheral edge portion of the thumbwheel out of light-trapping engagement with a mating portion of the camera proximate the film egress opening.

7. A one-time-use camera comprising an exposed film chamber, a filmstrip, a backframe opening at which successive sections of said filmstrip are exposed, a spool rotatable within said exposed film chamber to wind exposed sections of said filmstrip into a exposed film roll, and a film winding thumbwheel coaxially engaged with said spool to rotate the spool, is characterized in that:

a film egress opening at one end of said exposed film chamber is dimensioned to allow the exposed film roll to be unloaded from the exposed film chamber through said film egress opening; and said film winding thumbwheel light-tightly seals said exposed film chamber over said film egress opening and is removable to permit the exposed film roll to be unloaded from the exposed film chamber.

* * * * *